United States Patent [19]

Brande

[11] Patent Number: 4,695,195

[45] Date of Patent: Sep. 22, 1987

[54] FOLDING BOAT DOCK

[76] Inventor: Bruce R. Brande, 3214 Lettie, Ames, Iowa 50010

[21] Appl. No.: 836,327

[22] Filed: Mar. 5, 1986

[51] Int. Cl.⁴ ............................................. B63C 1/00
[52] U.S. Cl. ................................. 405/220; 405/221; 114/263
[58] Field of Search ................... 14/2.6, 27; 405/219-221; 114/263-266

[56] References Cited

U.S. PATENT DOCUMENTS

| | | | |
|---|---|---|---|
| 2,948,121 | 8/1960 | Karst | 405/220 |
| 2,987,024 | 6/1961 | Rush | 114/266 |
| 3,043,109 | 7/1962 | Erickson | 405/220 |
| 3,100,968 | 8/1963 | Bourdon | 405/221 |
| 3,220,196 | 11/1963 | Schollard | 114/52 |
| 3,279,141 | 10/1963 | Schmidt | 405/219 |
| 3,397,546 | 8/1968 | Eisert et al. | 405/220 |
| 3,420,331 | 1/1969 | Minnite | 14/27 |
| 3,421,327 | 1/1969 | Donaldson | 405/220 |
| 3,568,451 | 3/1971 | Gustin | 405/221 |
| 4,087,977 | 5/1978 | Kuhlman | 114/263 |
| 4,126,006 | 11/1978 | Lewis | 405/220 |
| 4,174,187 | 11/1979 | Parisien | 405/221 |
| 4,287,625 | 9/1981 | Dawson | 114/263 |

Primary Examiner—Joseph F. Peters, Jr.
Assistant Examiner—Jesûs D. Sotelo
Attorney, Agent, or Firm—Zarley, McKee Thomte, Voorhees & Sease

[57] ABSTRACT

A boat dock assembly for retrievable extension into a body of water comprises a base section secured to the shore, a plurality of dock sections pivotally secured in an end-to-end relation by connecting hinges, legs attached to the forward end of each dock section for supporting the dock section above the surface of the body of water, and a rail system for rolling the dock sections out of the body of water by pivoting each dock section in one direction about the respective dock hinge into a spiral configuration adjacent the base, commencing with the last dock section, and for unrolling the dock sections from the spiral configuration into the body of water by sequentially pivoting each dock section in the opposite direction about the dock hinges, commencing with the first dock section. The legs which are longer than the dock sections to which they are attached have at least one knee joint to permit the legs to fold when the dock sections are rolled into the spiral configuration. A locking pin locks the knee joint to prevent folding of the leg when the dock is in the extended position in the body of water. A foot element on the bottom of each leg allows the effective length of the leg to be adjusted from the dock surface and allows the leg to be easily raised from the bottom of the body of water without suction being created between the foot member and the bottom of the body of water.

36 Claims, 31 Drawing Figures

FOLDING BOAT DOCK

BACKGROUND OF THE INVENTION

In areas of the country where bodies of water freeze over in the winter, boat docks must be removed from the water prior to freezing to avoid damage to the dock. The installation and removal of the dock each year is hard manual labor. It is also desirable to remove the docks from the water during bad storms wherein large waves may knock down the dock or otherwise damage the dock. Furthermore, the owner of a dock may wish to remove the dock to prevent unauthorized use thereof when the owner is not present. However, due to the hard work which is required to remove and install a dock, the dock is normally not removed from the water except at the end of the boating season before the water freezes.

Accordingly, a primary objective of the present invention is the provision of a boat dock which can be quickly and easily installed into and removed from a body of water.

Another objective of the present invention is the provision of a boat dock which can be repeatedly installed into and removed from a body of water without the use of manual labor.

Another objective of the present invention is the provision of a folding boat dock which rolls and unrolls between an extended use position in the body of water and a retracted storage position adjacent the shore.

Still a further objective of the present invention is the provision of a boat dock which can be quickly and easily leveled without getting in the water.

Another objective of the present invention is the provision of a boat dock having legs with foot members on the bottom end thereof which can be easily pulled up from the bottom of the body of water with a minimum of force.

Another objective of the present invention is the provision of a boat dock having a plurality of dock sections which are pivotally secured in an end-to-end relation so as to permit the dock to be rolled into and unrolled from a spiral configuration.

A further objective of the present invention is the provision of a boat dock which can be placed in the water and removed therefrom by an electric motor.

Still another objective of the present invention is the provision of a boat dock that can be quickly and easily removed from the body of water so as to avoid damage to the dock and so as to prevent unauthorized use of the dock.

These and other objectives will become apparent from the following description of the present invention.

SUMMARY OF THE INVENTION

The boat dock of the present invention includes a base section secured to the shore and a plurality of elongated dock sections hingedly attached to one another in an end-to-end relation. The first dock section is pivotally secured to the base section. The lengths of the dock sections are successively shorter progressing from the base. Legs are attached to one end of each dock section and have a foot member which engages the bottom of the body of water such that the legs support the dock section above the surface of the body of water.

A plurality of rail members extend beneath the dock sections and are pivotally secured together in an end-to-end relation. The lengths of the rail members are also successively shorter progressing from the base. The rail members are mounted beneath the dock sections for axial movement with respect thereto. Each rail member has a slot therein having one end adapted to engage a pin attached to each of the dock sections. The length of the slots are successively shorter on each rail member, progressing from the base.

An elongated threaded shaft is mounted in the base section for rotation about its longitudinal axis. A truck assembly is threadably received on the shaft for movement therealong during rotation of the shaft and is pivotally connected to the first rail member.

An electric motor is provided to rotate the shaft in a clockwise or counterclockwise direction. When the shaft rotates in one direction, the truck assembly moves the rail members axially away from the base such that the ends of the slots in the rail members successively engage the pin attached to each respective dock section, commencing with the last dock section furthest from the base, and sequentially pivot the dock section upwardly about the dock hinge. Thus, the dock rolls into a spiral configuration. When the shaft rotates in the opposite direction, the truck assembly pulls the rail members axially toward the base such that the dock sections sequentially pivot in the opposite direction about the respective hinges and thereby unroll from the spiral configuration, commencing with the first dock section adjacent the base section.

The upper ends of the legs are pivotally secured to the second end of each dock section so as to be pivotable between a first position substantially perpendicular to the dock section when the dock assembly is extended into the body of water and a second position extending substantially along the dock sections when the dock assembly is rolled into the spiral configuration. Also, if the length of the leg is greater than that of the associated dock section, a foldable knee joint is provided in the leg. A pin slidably extends into the leg to lock and unlock the knee joint. Movement of the pin is controlled by a cam mounted on the dock section and a cam follower on the leg which cooperate to move the pin between a lock position and unlock position with respect to the knee joint. If necessary, a second knee joint may be provided to further fold the leg to accommodate rolling of the dock.

The foot member on the lower end of the leg is mounted on a shaft which is threadably received in the lower end of the leg. The shaft can be turned by use of a tool extending through the hollow leg and hollow knee joint pins such that the dock can be raised, lowered and leveled from the dock surface without getting into the water. Also, the foot member has a plurality of apertures therein through which mud, sand, and other matter passes when the leg is raised from the bottom of the body of water. A flexible pad is placed on the bottom of the foot member to prevent the foot member from penetrating the bottom of the body of water. The pad is connected to the foot member by straps which peal the pad from the bottom of the body of water without creating a suction therebetween when the leg is raised.

DETAILED DESCRIPTION OF THE DRAWINGS

Figures 1, 8, 9:
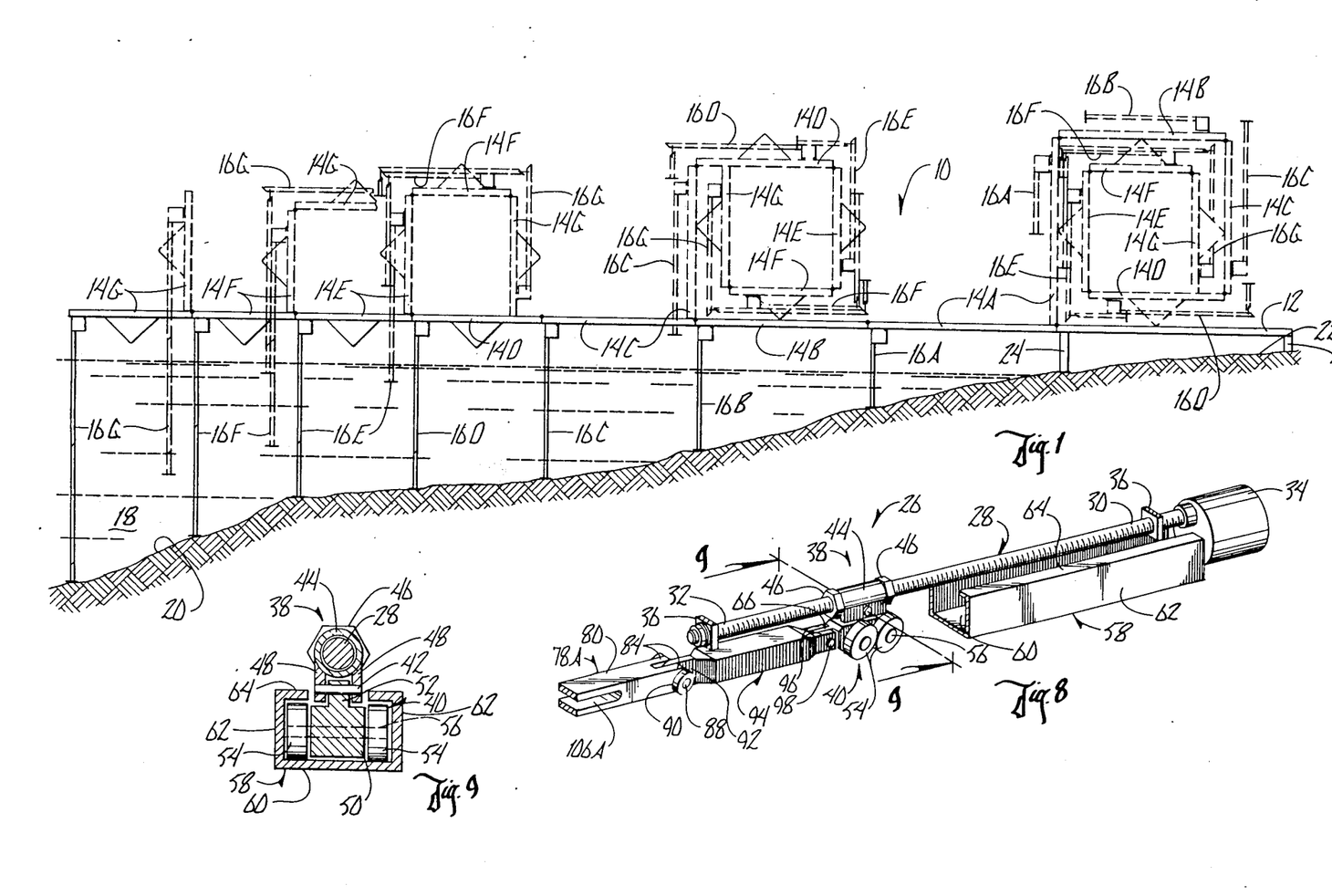
FIG. 1 is a schematic view showing the dock of the present invention in both the extended use position and the retrieved storage position.
FIG. 8 is a perspective view showing the drive assembly of the present invention.
FIG. 9 is a sectional view taken along lines 9—9 of FIG. 8.

The dock assembly of the present invention is generally designated in the figures by the reference numeral 10. Dock assembly 10 includes a base section 12, a plurality of dock sections 14A–14G, and a pair of legs 16A–16G for each dock section, respectively. As depicted in FIG. 1, dock assembly 10 is adapted to be rolled from an extended use position in a body of water 18 wherein the legs engage the bottom 20 of the body of water so as to support the dock sections 14 above the surface of the body of water, to a retracted storage position wherein the dock sections and legs fold and roll into a spiral configuration adjacent base 12. Conversely, dock assembly 10 can be unrolled from the spiral configuration of the storage position to the extended use position.

More particularly, base section 12 is anchored to shore 22 in any convenient manner, such as by footings 24. A drive assembly 26, best seen in FIGS. 2B, 3B, 8 and 9, is securely mounted beneath base section 12. Drive assembly 26 includes an elongated threaded shaft 28 having opposite ends 30 and 32, and which is rotatable about its longitudinal axis in either the clockwise or counterclockwise direction by means of an electric motor 34. A pair of support straps 36 extend from base 12 and support shaft 28 in a substantially horizontal disposition.

Drive assembly 26 further includes a traveling carriage 38 and a truck assembly 40 pivotally secured to the carriage by a pin 42. As seen in FIG. 8, carriage 38 includes a collar 44 having a threaded nut 46 attached to each end thereof by welding or the like, and depending flanges 48 between which pin 42 extends. Nuts 46 threadably mate with shaft 28 such that carriage 38 moves towards first end 30 of shaft 28 when the shaft is rotated in one direction and moves toward second end 32 of shaft 28 when the shaft is rotated in the other direction.

Truck assembly 40 includes a body 50 having a tongue 52 extending upwardly between flanges 48 for receiving pin 42. A pair of wheels 54 are mounted on each side of body 50 and are rotatably supported by axles 56 extending through body 50. A truck cradle or housing 58 extends beneath and along the length of shaft 28 and is connected to base section 12 in any convenient manner (not shown). Truck cradle 58 includes a bottom wall 60, opposite side walls 62 and opposite spaced apart upper wall 64 between which flanges 48 and tongue 52 extend. Truck cradle 58 provides a guide track and bearing surfaces for wheels 54. Truck assembly 40 also has a second tongue 66 projecting forwardly from body 50 thereof.

Figure 4:
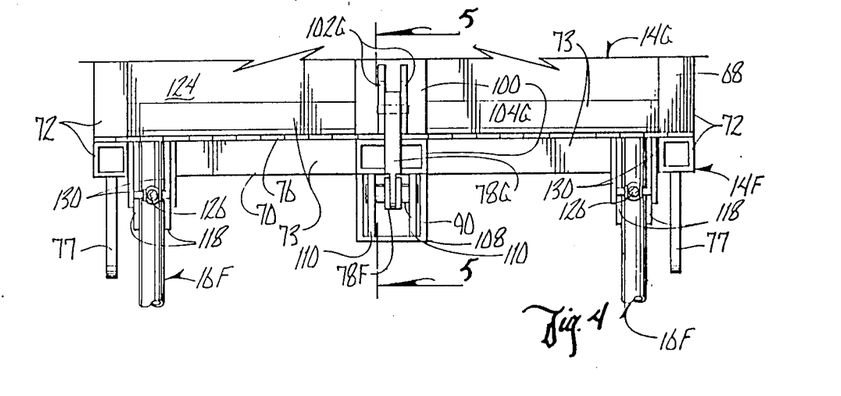
FIG. 4 is an enlarged end view taken along lines 4—4 of FIG. 2A.
Figure 10:
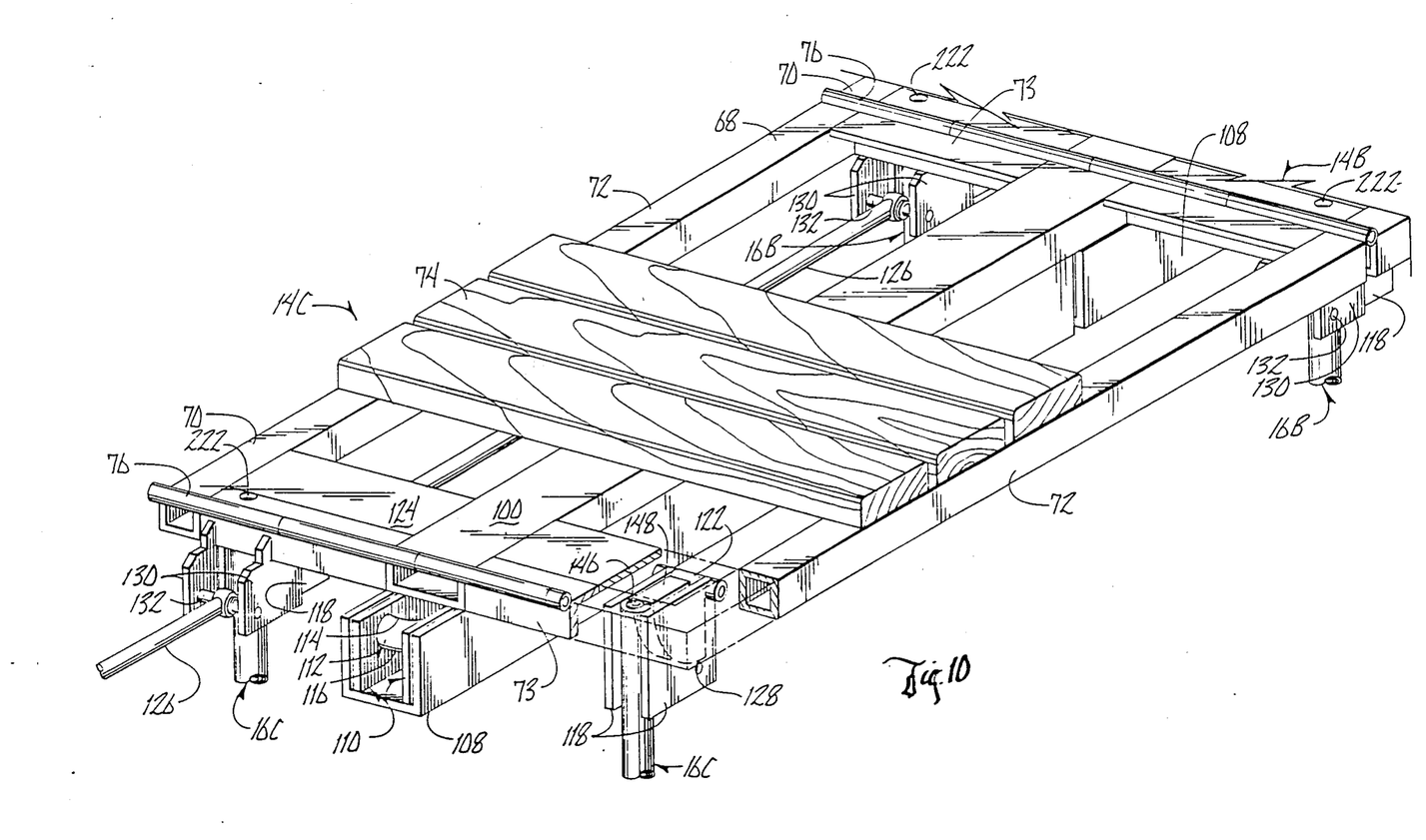
FIG. 10 is a perspective view showing the framework of a dock section.

Referring to FIGS. 4 and 10, each dock section 14 has a rearward end 68 and a forward end 70. Each dock section includes a pair of opposite side rails 72 and boards 74 spanning the width of dock section 14 and being supported by side rails 72 so as to form an upper surface upon which a person can walk. A cross brace or angle iron 73 is located at each end of the dock section to provide additional strength and rigidity. It is understood that this basic construction of each dock section 14 can be modified without departing from the scope of the present invention. For example, the upper walking surface may be formed by longitudinally extending planks supported at their opposite ends by cross bars extending across the width of the dock section.

Figure 2A:
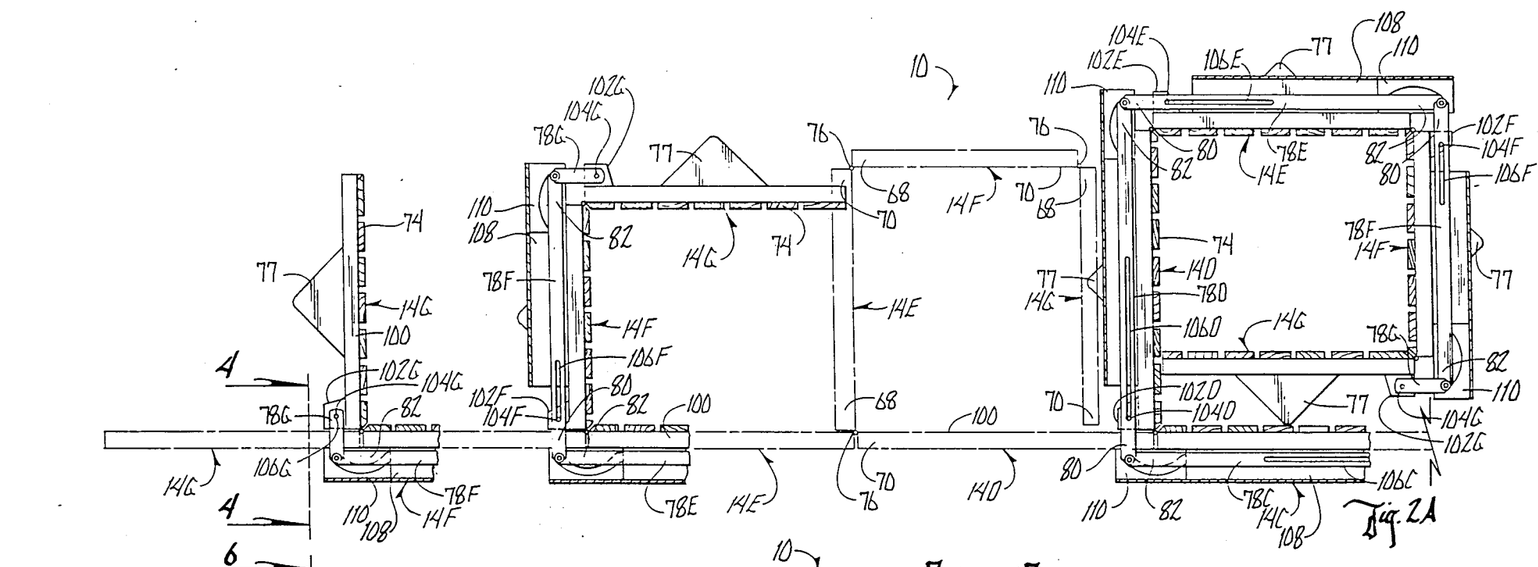
FIGS. 2A and 2B are continuations of one another and are side sectional views showing how the dock rolls into and unrolls from the spiral configuration of the retracted position, with the legs removed for clarity.
Figure 2B:
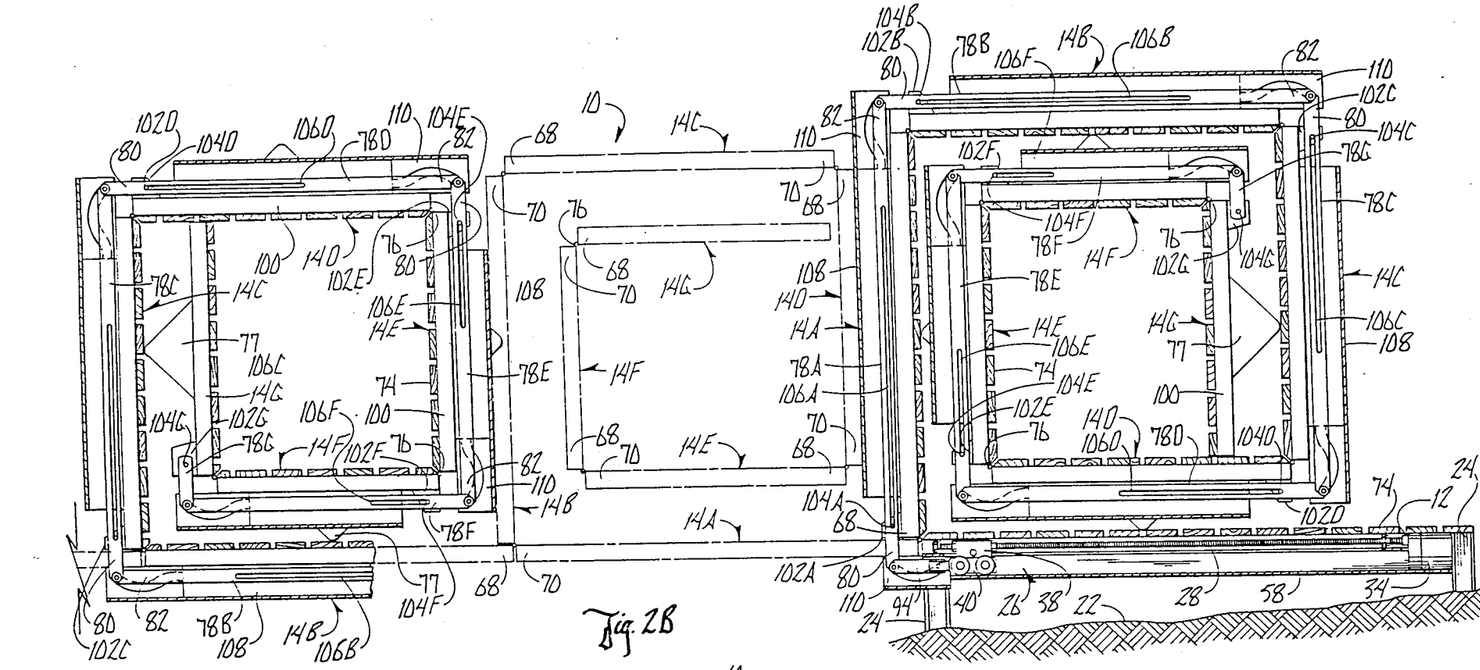
Figure 3A:
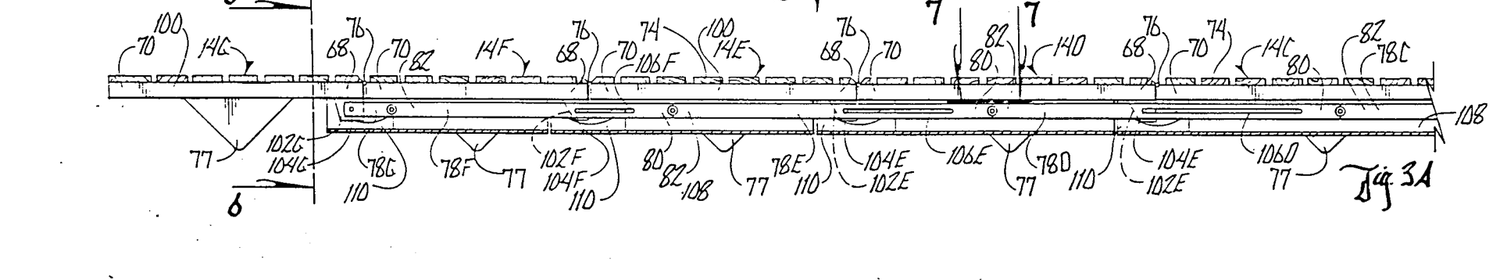
FIGS. 3A and 3B are continuations of one another and are side sectional views showing the dock in the extended position, with the legs removed for clarity.
Figure 3B:
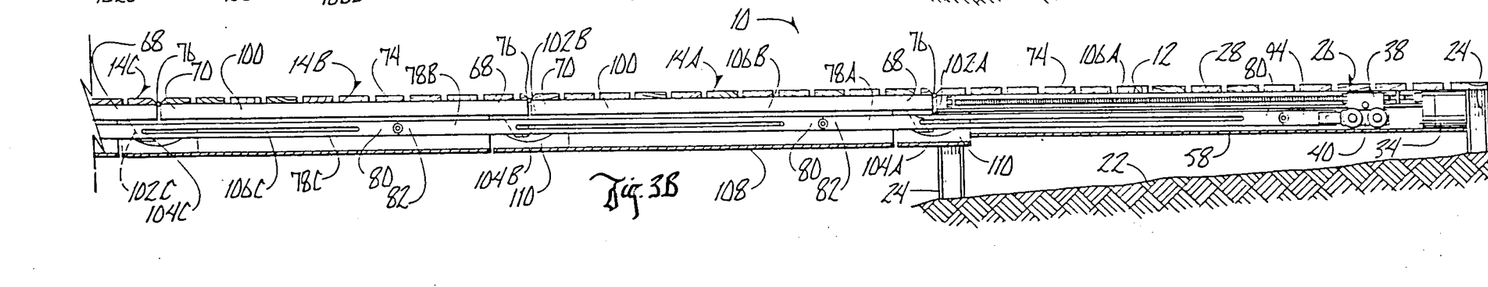

Rearward end 68 of each dock section is pivotally secured to forward end 70 of the preceding dock section by a dock hinge 76. For example, rearward end of dock section 14A is secured to the forward end of base section 12 by hinge 76 and the rearward end of dock section 14B is pivotally secured to the forward end of dock section 14A by a similar hinge 76. Preferably, hinge 76 extends across the width of the dock sections, however, shorter hinges located at each side of the dock sections may be utilized. The pivotal axis of hinge 76 is transverse to the longitudinal axis of the dock section so as to permit the dock sections to roll and unroll between the extended use position and the spiral retrieved position. Spacer elements 77 are provided on each side of dock sections 14D–14G for support of the dock assembly when rolled into the spiral configuration, as shown in FIGS. 2A and 2B.

Figure 7:
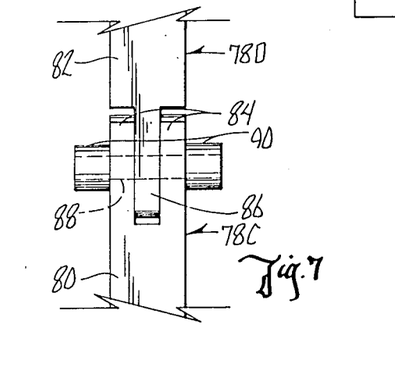
FIG. 7 is a top plan view showing the pivotal connection of the ends of the rail members taken along lines 7—7 of FIG. 3A.

The pivoting action of the dock sections is controlled by a plurality of elongated rail members 78A–78G extending beneath the dock sections. Each rail member has a rearward end 80 and a forward end 82. The rearward end 80 includes a pair of spaced apart ears 84 and the forward end 82 includes a tongue 86. The tongue 86 on the forward end of each rail member is received between the ears 84 on the rearward end of each succeeding rail member and is pivotally secured thereto by a pin 88 extending through the rail members and having enlarged bushings 90 on the opposite ends thereof, as best seen in FIG. 7. For example, forward end 82 of rail member 78E is pivotally connected to rearward end 80 of rail member 78F. Also, rearward end 80 of rail member 78A is pivotally secured to a tongue 92 on the forward end of a truck extender rail 94 by an identical pin and bushing assembly. In turn, the rearward end of truck extender rail 94 has a pair of spaced apart ears 96 for receiving tongue 66 of truck assembly 40, with a pin 98 pivotally securing the truck extender rail to the truck assembly, as seen in FIG. 8.

A strut 100 is secured beneath each dock section 14 and extends along the length thereof. A pair of ears 102A–102G extends from the strut 100 on each dock section 14A–14G, respectively. A pin 104A–104G extends between the respective ears on each dock section. Each rail member 78A–78G extends between the respective ears 102A–102G and has an opening or slot 106A–106G through which the respective pin 104A–104G extends so as to slidably support the respective rail member, as best seen in FIGS. 2A, 2B, 3A, 3B and 6.

Figure 5:
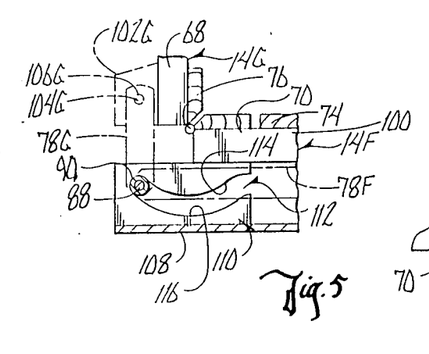
FIG. 5 is a partial side elevational view taken along lines 5—5 of FIG. 4 showing the roll control cam.
Figure 6:
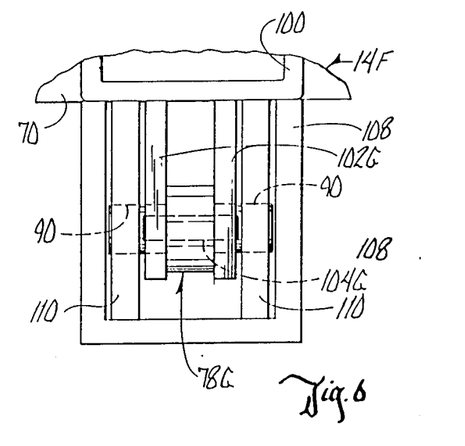
FIG. 6 is an enlarged partial end view taken along lines 6—6 of FIG. 3A.

Each dock section 14A–14G also has a rail housing 108 connected to the respective dock strut 100 and enclosing the rail members 78. Secured within each rail housing 108 adjacent the forward end 70 of each dock section is a pair of cam plates 110 having an open-ended slot 112 therein defining an upper cam surface 114 and a lower cam surface 116, as best seen in FIG. 5. Bushings 90 on each rail member are adapted to be received within slot 112 which guides the movement of rearward end 80 of the rail member around hinge 76 as the dock sections pivot thereabout, as described more fully below. Also, the engagement of bushings 90 with the upper and lower cam surfaces 114 and 116, respectively, controls the pivoting action of the dock sections by preventing flopping of the sections after they pivot over center. Cam plates 110 are positioned within rail housing 108 adjacent the forward end 72 of each dock section and extends slightly beyond this end of the dock section.

As seen in the drawings, with the following exception, each dock section 14A–14G and each rail member 78A–78G, is successively shorter progressing from base section 12. This construction permits dock assembly 10 to roll into the spiral configuration. The exception is that dock section 14G may be substantially the same length as dock section 14E such that the forward end 70 of section 14G supportingly engages the upper surface of dock section 14D when dock assembly 10 is rolled into the spiral configuration, as best seen in FIG. 2B.

Dock assembly 10 is rolled from the extended position to the retracted position by actuating electric motor 34 to turn shaft 28 in one direction. As shaft 28 turns, truck assembly 40 moves forwardly towards the body of water so as to push rail members 78A–78G axially away from base section 12. As the rail members move forwardly, the rearward end of each slot 106A–106G sequentially engages the respective dock pin 104A–104G, commencing with last rail member 78G and last dock section 14G, so as to sequentially pivot each dock section about the respective dock hinge 76. Such sequential pivoting of the dock sections is accomplished due to the varied length of rail slots 106A–106G. The length of such slots is successively shorter, progressing from first rail member 78A to last rail member 78G. Slot 106G is shown to be a round hole.

As the rearward end of each rail member approaches the rearward end 68 of the respective dock section, bushing 90 is received within arcuate slot 112 of cam plates 110 and is guided thereby through an arcuate path as the dock section is pivoted about the respective dock hinge 76. As dock assembly 10 continues to roll into the spiral configuration, the engagement of bushings 90 with cam surfaces 114 and 116 of cam plates 110 prevents the dock sections from flopping after the center of gravity of the previously pivoted sections passes over center. Also, as dock assembly 10 continues to roll into the spiral configuration, the spacer elements 77 on each dock section engage the upper surface of an associated dock section, as seen in FIG. 2B, to allow room for the legs which are folded along the dock sections and to provide support for the retracted dock assembly.

Dock assembly 10 is unrolled from the spiral configuration of the retrieved position to the extended position by actuating electric motor 34 to turn shaft 28 in the opposite direction. As shaft 28 turns in the opposite direction, truck assembly 40 moves rearwardly away from the body of water so as to pull the rail members 78A–78G towards base section 12 and thereby sequentially pivot the dock sections in the opposite directions about the respective dock hinges 76, commencing with dock section 14A.

Figure 11:
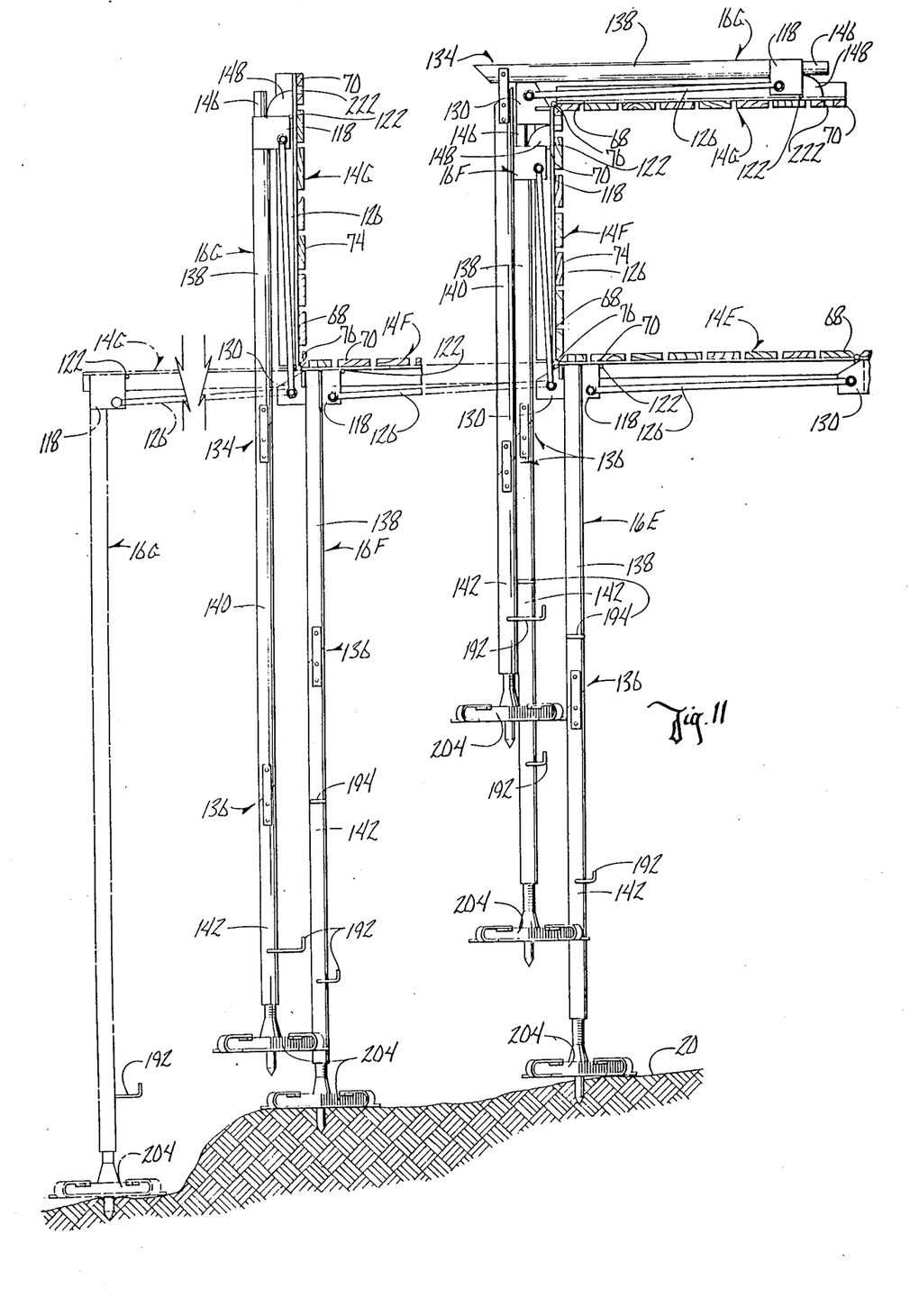
FIG. 11 is a side elevational view of the legs of the present invention in a partially folded position.
Figures 12, 13:
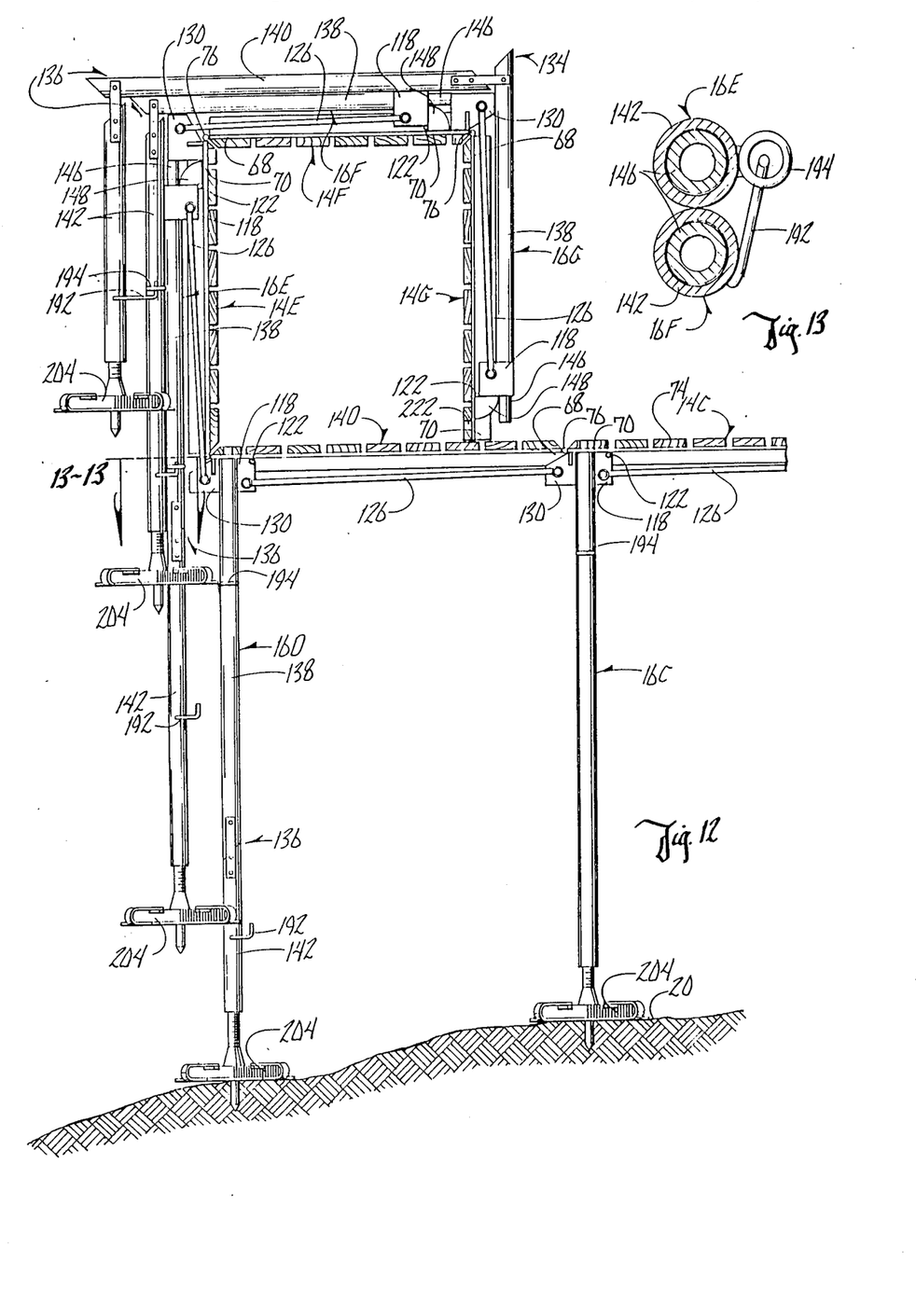
FIG. 12 is a side elevational view of the legs in a further folded position.
FIG. 13 is a sectional view of the legs taken along lines 13—13 of FIG. 12.

Legs 16 of dock assembly 10 are adapted to pivot and fold to accommodate the rolling and unrolling movement of the dock assembly. FIGS. 11 and 12 show the legs in various stages of folding.

Figure 14:
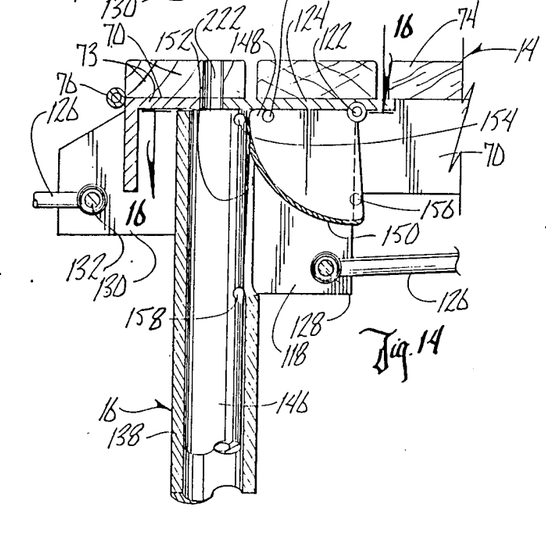
FIG. 14 is a partial sectional view of the upper end of a leg in an extended position and showing one embodiment of the locking means in the locked position for locking the knee joint of the leg.
Figure 15:
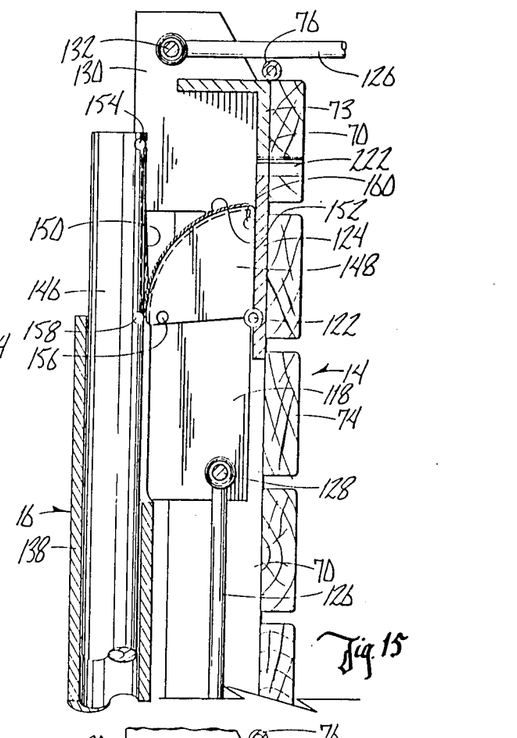
FIG. 15 is a partial sectional view of the upper end of a leg in a retracted position and showing the locking means of FIG. 14 in the unlocked position.
Figure 16:
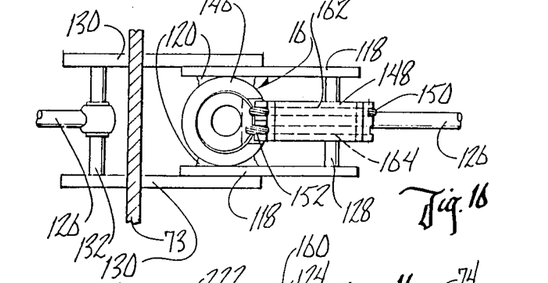
FIG. 16 is a view taken along lines 16—16 of FIG. 14.

More particularly, each dock section has a pair of legs pivotally secured thereto adjacent forward end 70 thereof. The legs are positioned on the inside of each side rail 72, as shown in FIG. 4. As seen in FIGS. 10 and 16, each leg is securely mounted between a pair of hip plates 118 by welding 120 or the like. A hip plate hinge 122 pivotally connects the upper rearward edge of the hip plates to a support plate 124 extending between each side rail 72 and center strut 100 beneath boards 74, as seen in FIGS. 10 and 14–18. A pivot actuator rod 126 has a forward end pivotally connected to hip plate 118 by bolt 128 or the like, and a rearward end pivotally connected to an actuator plate 130 on the preceding dock section by bolt 132 or the like. Actuator plates 130 are secured to the respective dock section and do not pivot with respect thereto, as do hip plates 118.

Thus, as each dock section pivots clockwise about dock hinge 76, as shown in FIGS. 11 and 12, actuator rod 126 pivots the respective legs 16 about hip plate hinge 122 such that the leg is pulled into close proximity with the dock section with the longitudinal axis of the leg being substantially parallel to the longitudinal axis of the dock section. Conversely, when the dock section pivots in a counterclockwise direction about dock hinge 76 as shown in FIGS. 11 and 12, actuator rod 126 pivots leg 16 in a clockwise direction about hip plate hinge 122 until the longitudinal axis of the leg is substantially perpendicular to that of the dock section.

To accommodate the rolling and unrolling action of dock assembly 10, any leg that is substantially longer than the combined length of dock section to which it is connected and the preceding dock section is provided with an upper knee joint 134 and a lower knee joint 136 which divide the leg into an upper segment 138, a middle segment 140, and a lower segment 142. The length of the upper leg segment is slightly longer than the length of the dock section to which the leg is attached and the length of the middle leg segment is slightly longer than the length of the preceding dock section.

If the length of the leg is substantially greater than the length of the dock section to which it is attached, but substantially less than the combined length of the section to which it is attached and the preceding dock section, only one knee joint is necessary. The knee joint of such a single-jointed leg is identical to lower knee joint 136 and is therefore also labeled in the Figures with reference numeral 136. Similarly, the upper and lower leg segments comprising the single-jointed leg are labeled with reference numerals 138 and 142, respectively.

For example, referring to FIGS. 11 and 12, the length of leg 16G is greater than the combined lengths of dock sections 14G and 14F. Therefore, leg 16G is provided with a upper knee joint 134 and lower knee joint 136 which divide the leg into upper segment 138 having a length slightly longer than dock section 14G, middle leg segment 140 having a length slightly longer than dock section 14F, and lower leg segment 142 having a length less than dock section 14E. Similarly, leg 16F has a length greater than dock section 14F but less than the combined lengths of dock sections 14E and 14F. Therefore knee joint 136 is provided in leg 16F and divides the leg into upper segment 138 with a length slightly longer than dock section 14F and lower leg segment 142 having a length, at best, slightly longer than that of dock section 14E.

Each leg having at least one knee joint has a means for locking and unlocking the knee joint. The locking means includes a pin 146 which is slidably received within the leg which is hollow. The locking means further includes a cam 148 secured to hip plates 118 for pivotal movement therewith about hip plate hinge 122, as seen in FIGS. 14–16. The pivotal movement of cam 148 controls the sliding movement of locking pin 146 by means of a cam follower.

In one embodiment shown in FIGS. 12–16, the cam follower comprises a first cable 150 and a second cable 152. Cables 150 and 152 extend in opposite directions around cam 148 and are secured to locking pin 146. One end of cable 150 is connected to locking pin 146 at a point 154 near the upper end thereof. The opposite end of cable 150 is connected to cam 148 at a point 156 on cam 148 below connection point 154. One end of cable 152 is connected to locking pin 146 at a point 158 positioned below connection point 154 of cable 150. The opposite end of cable 152 is connected to cam 148 at a point 160 positioned above connection point 156 of cable 150. A pair of grooves 162 and 164 are provided in cam 148 for receiving cables 150 and 152, respectively. As actuator rod 126 pivots hip plate 118 and leg 116 counter-clockwise about hip hinge pin 122 from the position shown in FIG. 14 to the position shown in FIG. 15, cam 148 also pivots with respect to locking pin 146 such that cable 152 pulls the locking pin upwardly to release the knee joints so that leg 16 will fold, as explained hereinafter. Conversely, when actuator rod 126 pivots hip plate 118 and leg 16 clockwise about hip hinge pin 122 from the position shown in FIG. 15 to the position shown in FIG. 14, cable 150 pulls locking pin 146 downwardly to lock the knee joints such that leg 16 is rigid, as further described below.

Figure 17:
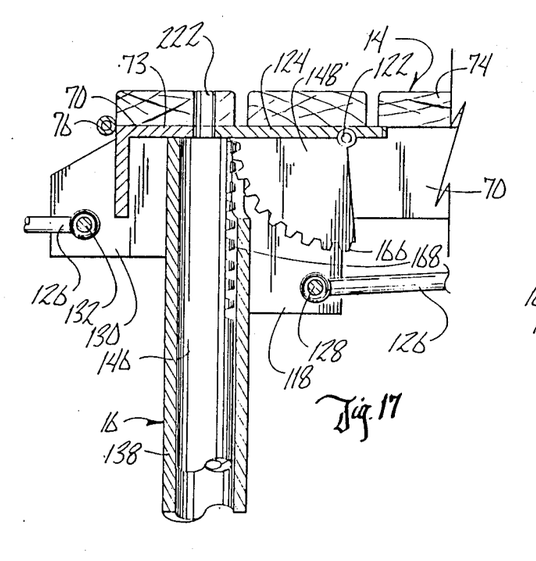
FIG. 17 is a partial sectional view similar to FIG. 14 showing a second embodiment of the locking means for locking the knee joint of the leg, with the locking means being in the locked position.
Figure 18:
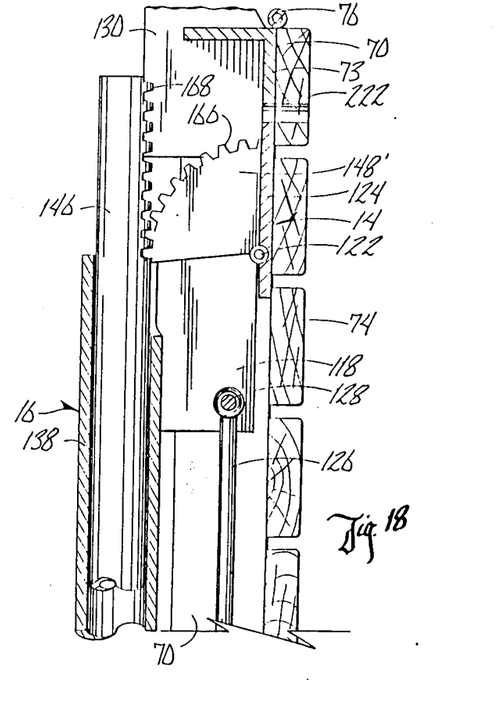
FIG. 18 is a partial sectional view simlar to FIG. 15 showing the second embodiment of the locking means in the unlocked position.

In an alternative embodiment of the locking means shown in FIGS. 17 and 18, a cam 148' has a plurality of teeth 166 on the cam surface thereof while locking pin 146' has a plurality of teeth 168 thereon which mesh with teeth 166 on cam 148'. As described above, when cam 148' pivots with respect to locking pin 146, teeth 168 which form a cam follower surface mesh with teeth 166 of cam 148 so as to raise and lower pin 146' between the locked position and the unlocked position, described below.

FIGS. 19–25 are enlarged views showing the knee joints 134 and 136 of a leg 16 having multiple knee joints. If a leg has only one knee joint, the joint is identical to knee joint 136. Thus, the following description with respect to the lower knee joint 136 also applies to a single-jointed leg.

Upper leg segment 138 is connected to middle leg segment 140 by a pair of straps 172. Upper fasteners 173 pivotally attach the upper end of straps 172 to upper leg segment 138 while a pair of lower fasteners 174 rigidly secure the lower end of straps 172 to middle leg segment 140. Similarly, straps 175 pivotally connect middle leg segment 140 to bottom leg segment 142 by means of upper fasteners 176 and lower fasteners 177. At each knee joint 134 and 136, legs 16 are cut at an angle. Also, in upper knee joint 134, an opening 178 exists in the wall of leg 16 for a purpose to be described below.

Figure 19:
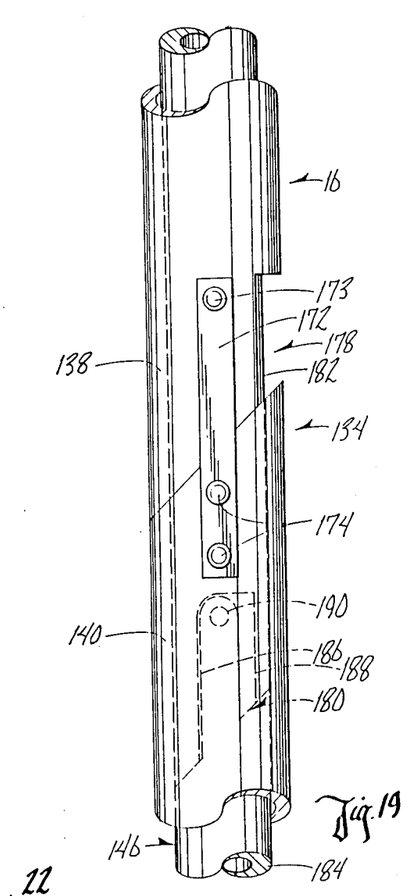
FIG. 19 is an enlarged side view of the upper knee joint of a double-jointed leg.
Figure 20:
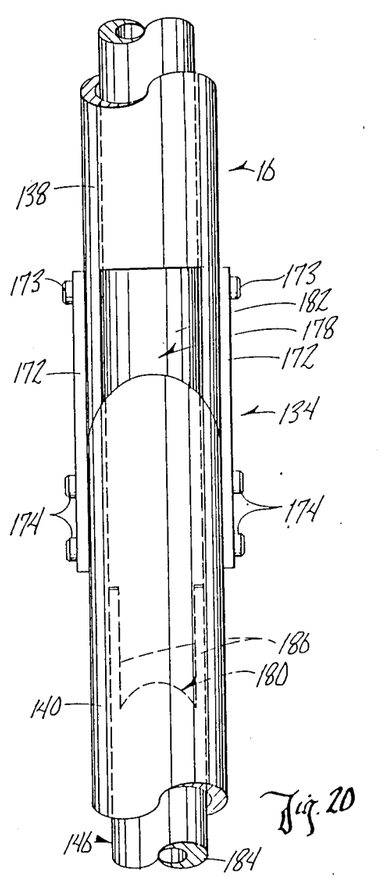
FIG. 20 is a front view of the knee joint shown in FIG. 19.
Figures 21, 22:
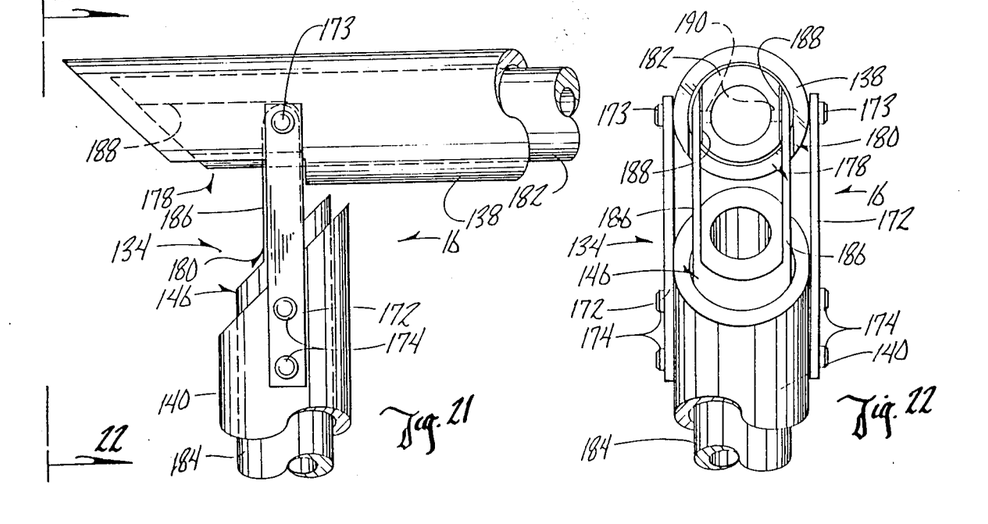
FIG. 21 is a side view showing the folded position of the upper knee joint of a double-jointed leg.
FIG. 22 is a view taken along lines 22—22 of FIG. 21.
Figure 23:
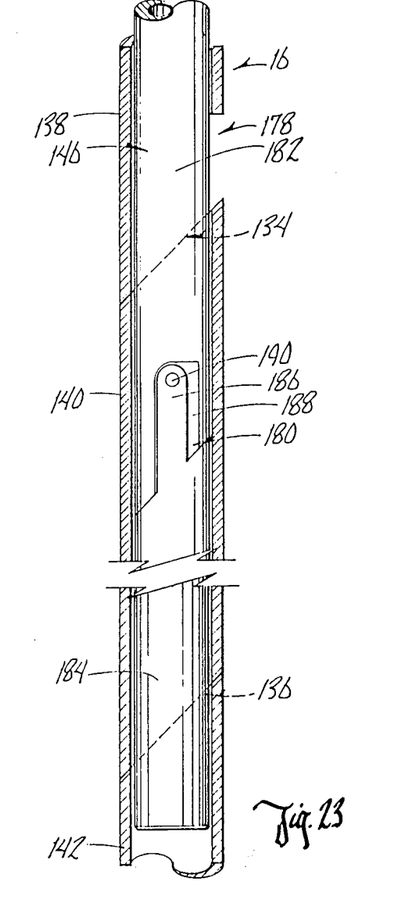
FIG. 23 is a side sectional view showing the knee joint locking pins in a locked position for the upper and lower knee joints of a double-jointed leg.
Figure 24:
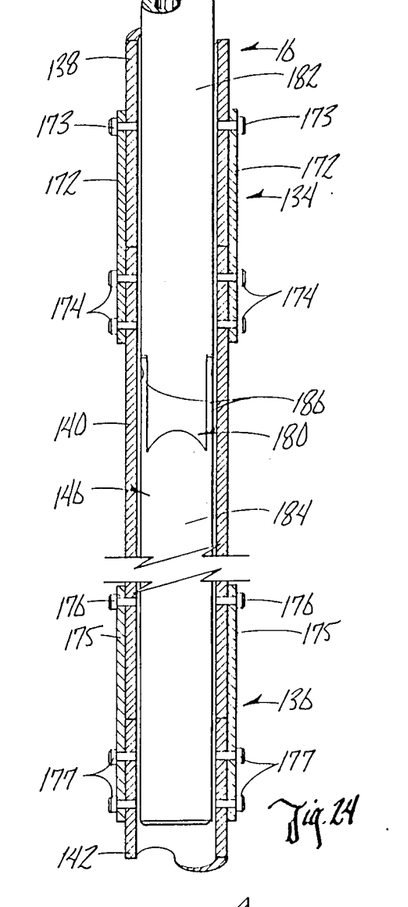
FIG. 24 is a front sectional view showing the locking pins in a locked position for the upper and lower knee joints of a double-jointed leg.
Figure 25:
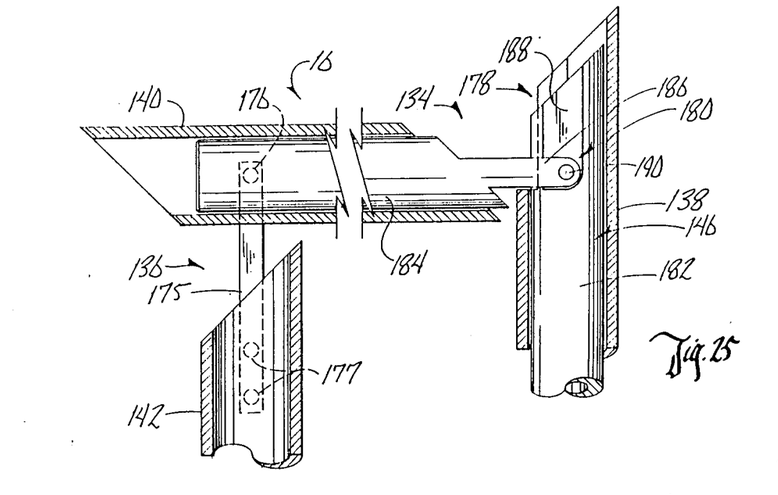
FIG. 25 is a side sectional view showing the locking pins in a fully folded position for the upper and lower knee joints of a double-jointed leg.

Adjacent upper knee joint 134, locking pin 146 also has a joint 180 defining an upper pin section 182 and a lower pin section 184, as best seen in FIGS. 23-25. A pair of ears 186 extend upwardly from lower section 184 and are received within a recessed area 188 on upper pin section 182 and are pivotally secured thereto by fasteners 190. When pin 146 is in the locked position, upper pin section 182 extends below knee joint 134 on leg 16 and lower pin section 184 extends below lower knee joint 136, as best seen in FIGS. 19 and 23. When pin 146 is raised to the unlocked position by cam 148 or 148' during the pivoting action of leg 16, joint 180 of pin 146 substantially coincides with joint 134 such that middle leg segment 140 is free to pivot with respect to upper leg segment 138 about strap fastener 173, and lower pin section 184 is moved upwardly beyond lower knee joint 136 such that lower leg segment 142 is free to pivot with respect to middle leg segment 140 about strap fastener 176, as best seen in FIGS. 21 and 25. During such folding of leg 16 at knee joint 134, lower pin section 184 pivots with respect to upper pin section 182 about ear fastener 190. Recessed area 188 in upper pin section 182 and opening 178 in upper leg segment 136 accommodates the movement of ear 186 during the folding action of the leg.

In a single-jointed leg, locking pin 146 has no joints and extends beyond knee joint 136 when pin 146 is in the locked position, thereby preventing the leg from folding at the knee joint. When pin 146 is raised to the unlocked position by cam 148 or 148', the lower end of the pin is raised to a position above knee joint 136 such that the leg is free to fold at the joint.

As dock sections 14 are sequentially rolled into the spiral configuration, the respective legs 16 are pivoted about hip plate hinge 122 by actuator rod 126. Simultaneously, cam 148 or 148' pulls locking pin 146 upwardly so as to simultaneously release knee joints 134 and 136 such that the legs are free to fold alongside the dock sections. Conversely, when the dock sections are unrolled from the spiral configuration, actuator rods 126 push legs 16 into a perpendicular relationship with respect to the dock sections while cam 148 or 148' simultaneously moves locking pin 146 downwardly in the leg so as to lock knee joints 134 and 136, and thereby rigidify the legs.

When the dock sections roll into the spiral configurations, and the legs fold accordingly by the force of gravity, it is desirable to prevent the free lower leg segment 142 from flopping as the dock assembly continues to roll into the spiral configuration. Accordingly, an L-shaped peg 192 is attached to the leg adjacent the lower end thereof and is adapted to be received in a leg securing ring 194 attached to the side of the leg on the preceding dock section, as seen in FIGS. 12 and 13. Thus, as the dock assembly is rolled into the spiral configuration, the end of peg 192 moves into securing ring 194 on the adjacent leg so as to hold the legs together and to prevent the outermost leg from flopping over as the lower segment 142 of the leg moves from a horizontal disposition to an inverted vertical position.

Legs 16 are hollow along their length, as are locking pins 146. As seen in FIGS. 26–29, the lower end of each leg is internally threaded so as to threadably receive the upper end of a threaded shaft 196. Shaft 196 has a reduced diameter section 198 defining a shoulder 200 adjacent the lower end thereof, and terminates in a point 202. A foot element 204 is received over reduced diameter portion 198 and engages shoulder 200. A cotter pin 206 or the like extending through reduced diameter portion 198 holds foot element 204 in position. A washer 208 exists between cotter pin 206 and foot element 204.

Foot element 204 includes a frame 210 having a gridwork design, including a plurality of openings 212 extending through the frame. A pad 214 is secured to the edges of frame 210 by straps 216. While FIGS. 26–29 show straps 216 to be integrally formed with the pad 214, such straps may be separate pieces secured to the pad in any convenient manner.

Figures 26, 27, 28, 29:
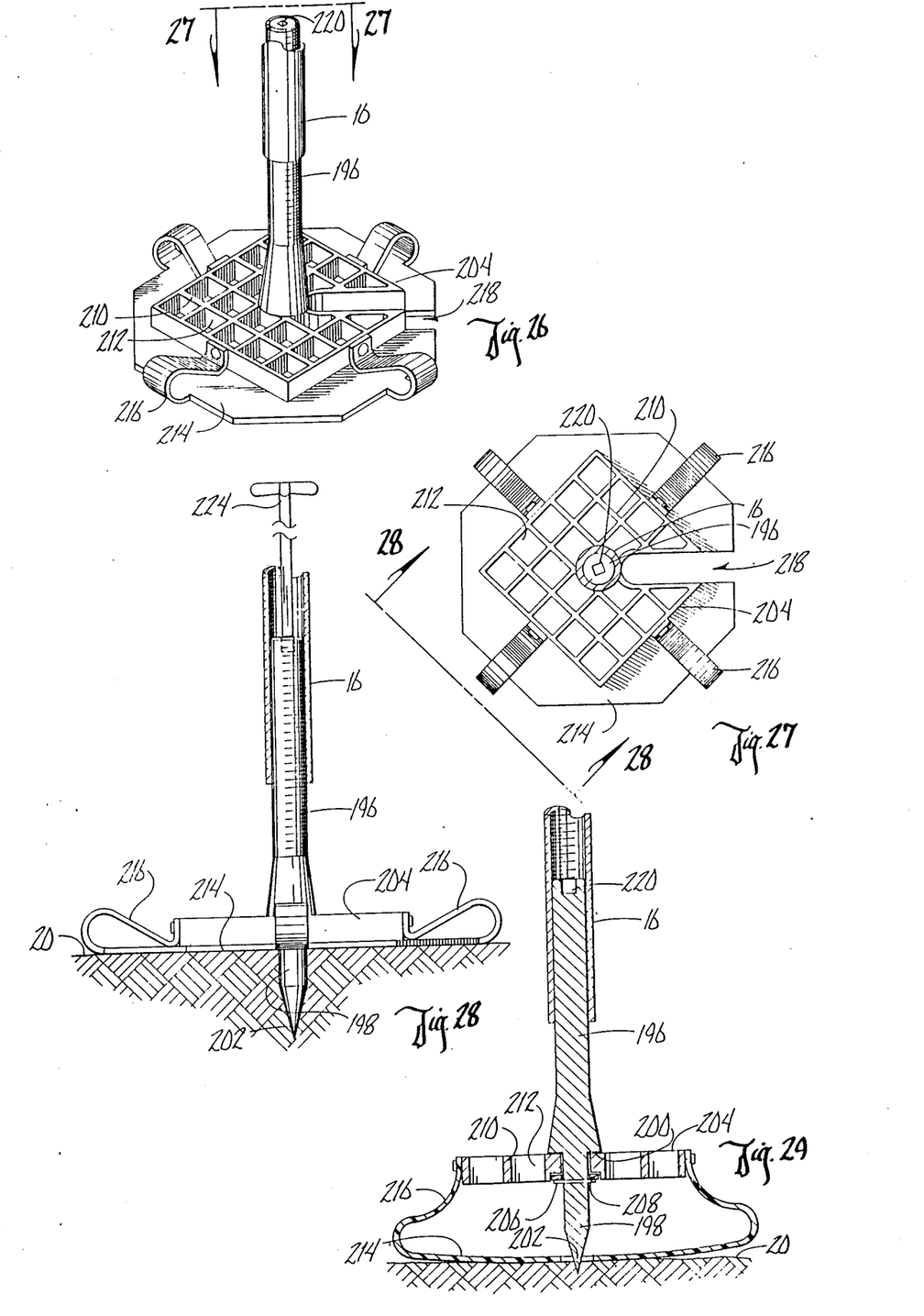
FIG. 26 is a perspective view of the foot member at the lower end of each leg.
FIG. 27 is a top sectional view taken along lines 27—27 of FIG. 26.
FIG. 28 is a side view taken along lines 28—28 of FIG. 27, having the foot member engaging the bottom of the body of water.
FIG. 29 is a side sectional view similar to FIG. 28 with the leg raised off the bottom of the body of water.

Foot element 204 prevents leg 16 from penetrating the bottom of the body of water when the dock assembly is in the extended position. Referring to FIG. 29, when the dock assembly is rolled into the spiral configuration such that the legs are raised from the bottom of the body of water, pad 214 becomes spaced apart from frame 210 so as to permit sand, mud and other matter that has accumulated on foot element 204 to pass through openings 212, thereby minimizing the weight which must be raised. Also, straps 216 peel the outer edges of pad 214 upwardly as the leg is raised so as to prevent any suction between the bottom of the body of water and pad 214. Such elimination of suction further minimizes the forces required to lift the leg.

As best seen in FIG. 27, foot element 204 includes an elongated slot 218 therein. Slot 218 is adapted to receive a portion of the leg on the next preceding dock section such that as the dock assembly is rolled into the spiral configuration, the legs are maintained in close proximity to one another, as seen in FIGS. 11 and 12.

Threaded shaft 196 has a recess 220 in the top end thereof. Recess 220 is adapted to matingly receive the end of a tool 224 extending through the leg such that shaft 196 can be rotated about its longitudinal axis as shown in FIG. 29. Rotation of shaft 196 in one direction increases the effective length of the leg while rotation of shaft 196 in the opposite direction reduces the effective length of the leg. Accordingly, each dock section 14 can be leveled and can be raised or lowered with respect to the surface of the body of water by simply rotating shaft 196 in one direction or the other. An opening 222 is provided in each dock section to permit access to recess 220 for the tool, as seen in FIGS. 11, 12, and 14–18.

It is understood that the folding dock sections 14A–14G described previously could be floatably supported on the surface of the body of water by buoyant pontoons or the like, with legs 16 eliminated therefrom. The rolling and unrolling action of such a floating dock would be accomplished in the same manner, that is, with rail members 78A–78G and drive assembly 26.

Thus, dock assembly 10 of the present invention accomplishes at least all of the stated objectives.

What is claimed is:

1. A boat dock assembly for retrievable extension into a body of water from the shore, comprising:
    a base secured to the shore;
    a plurality of elongated dock sections, including a first and last dock section, each having opposite forward and rearward ends and opposite sides,
    a plurality of hinge means for pivotally securing said dock sections together in an end-to-end relation, with said rearward end of said first dock section being pivotally secured to said base by one of said hinge means, each of said hinge means having a pivot axis transverse to the longitudinal axis of said dock sections,
    a plurality of support means attached to each dock section for supporting said dock sections above the surface of the body of water; and
    means for rolling said dock sections out of said body of water by sequentially pivoting each dock section in one direction above the respective hinge means, commencing with said last dock section, such that said dock sections roll into a spiral configuration adjacent said base, and for unrolling said dock sections from said spiral configuration into said body of water by sequentially pivoting each dock section in the opposite direction about the respective hinge means, commencing with said first dock section;
    said means for rolling and unrolling said dock sections including a series of rail members operatively connected to said dock sections and means for extending and retracting said rail members such that said dock sections roll and unroll, respectively.

2. The assembly of claim 1 wherein each dock section includes spacer means for maintaining a space between adjacent dock sections when said dock assembly is in said spiral configuration.

3. The assembly of claim 1 wherein said support means includes a pair of legs attached to said opposite sides of each dock section and adapted to engage the bottom of the body of water so as to support said dock sections above the surface of the body of water.

4. The assembly claim 3 further comprising a foot member on the lower end of each leg and engaging the bottom of the body of water such that said leg supports said dock section above the surface of the body of water, and adjustment means on said foot member for adjusting the height of each dock section.

5. The assembly of claim 3 further comprising a foot member on the lower end of said legs and operatively engaging the bottom of the body of water such that said dock section is supported by said legs above the surface of said body of water, and means on said foot member for preventing suction between said foot member and the bottom of the body of water when said leg means are removed from the water.

6. The assembly of claim 3 further comprising second hinge means for pivotally connecting said upper end of each of said legs to the respective dock sections such that each leg pivots between a first position when said dock assembly is extended into said body of water wherein said legs extend substantially perpendicularly from said dock section and a second position when said dock assembly is rolled into said spiral configuration wherein said legs extend substantially along said dock sections.

7. The assembly of claim 6 wherein each of said legs has securing means for securing the leg to an adjacent leg on the preceding dock section when it pivots to said second position.

8. The assembly of claim 6 wherein each of said legs which is longer than said dock section to which said leg is attached includes a first foldable knee joint intermediate the upper and lower ends thereof, and releasable locking means for operatively locking said knee joint to prevent folding of said leg when said leg is in said first position and for unlocking said knee joint to permit folding of said leg for movement to and from said second position during the rolling and unrolling action of said dock section.

9. The assembly of claim 8 wherein said locking means includes first pin means movable between a locked position for locking said knee joint and an unlocked position for unlocking said knee joint.

10. The assembly of claim 9 wherein said legs are hollow and said first pin means is slidably movable within the respective leg between said locked and unlocked positions.

11. The assembly of claim 9 wherein said locking means further includes a cam operatively connected to said dock section and a cam follower operatively connected to said first pin means such that as said leg and said dock section move relative to one another during the pivoting action of said dock section, said cam and cam follower cooperate to automatically move said first pin means between said locked and unlocked positions.

12. The assembly of claim 11 wherein said cam follower includes first and second cables each having opposite first and second ends, said first ends of said first and second cables being connected to said first pin means at spaced apart upper and lower points, respectively, and said second ends of said first and second cables being connected to said cam at spaced apart lower and upper points, respectively.

13. The assembly of claim 11 wherein said cam follower is a plurality of gear teeth on said first pin means which matingly engage with a plurality of gear teeth on said cam.

14. The assembly of claim 9 wherein said first pin means is hollow and said assembly further comprises an elongated shaft threadably received in and extending from the lower end of each leg and a foot member on said shaft for engaging the bottom of the body of water, said shaft being rotatable with respect to said leg by a tool extending through said leg and through said first pin means so as to raise and lower said dock section with respect to the bottom of said body of water.

15. The assembly of claim 8 wherein said knee joint divides said leg into an upper leg segment and a lower leg segment, the length of said upper leg segment being slightly longer than the length of said dock section to which said leg means is attached.

16. The assembly of claim 15 wherein each of said lower leg segments which is longer in length than said dock section next preceding the dock section to which said leg is attached, has a second foldable knee joint and a second pin means in said leg operatively connected to said first pin means for slidable movement therewith between a locked position for operatively locking said second knee joint to prevent folding of said lower leg segment when said leg is in said first position and an unlocked position for unlocking said second knee joint to permit folding of said lower leg segment during the rolling and unrolling action of said dock section to which said leg is attached.

17. The assembly of claim 16 wherein said second knee joint divides said lower leg segment into a middle leg section and a bottom leg section, the length of said middle leg section being slightly longer than the length of said dock section next preceding the dock section to which said leg is attached.

18. The assembly of claim 16 wherein said first and second pin means are pivotally connected to one another adjacent said first knee joint.

19. The assembly of claim 16 wherein said first and second pin means is hollow, and said assembly futher comprises an elongated shaft threadably received in and extending from the lower end of each leg and a foot member on said shaft for engaging the bottom of the body of water, said shaft being rotatable with respect to said leg by a tool extending through said leg and through said first and second pin means so as to raise and lower said dock section with respect to the bottom of said body of water.

20. The assembly of claim 1 wherein each dock section pivots substantially 90° with respect to the adjacent dock section during said rolling and unrolling thereof.

21. The assembly of claim 1 wherein said rail members are pivotally secured to one another in an end-to-end relation by pin means.

22. The assembly of claim 21 wherein each of said dock sections has a pin fixed thereto, each of said rail members being slidably mounted on one of said pins, and each of said rail members having pin engagement means thereon for sequentially engaging the respective pins on said dock sections when said rail members are extended so as to sequentially pivot said dock sections about the respective hinge means, commencing with said last dock section, and thereby roll said dock assembly into said spiral configuration.

23. The assembly of claim 22 wherein said dock sections sequentially pivot about the respective hinge means, commencing with said first dock section, so as to unroll said dock assembly from said spiral configuration when said rail members are retracted.

24. A dock assembly extending into a body of water from the shore, comprising:
   at least one elongated dock section having opposite forward and rearward ends and opposite sides;
   a pair of hollow legs attached to each side of said dock section and having opposite upper and lower ends, said lower end being internally threaded;
   a foot member on the lower end of each leg and engaging the bottom of the body of water such that said legs support said dock section above the surface of the body of water;
   adjustment means on said foot member for adjusting the height of each side of said dock section, said adjustment means comprising an externally threaded shaft extending from said foot member and being threadably received in said lower end of said leg such that rotation of said shaft in one direction raises said dock section and rotation of said shaft in the opposite direction lowers said dock section;
   said shaft having an upper end with a recess therein adapted to receive a tool inserted through said leg to rotate said shaft.

25. A dock assembly extending into a body of water from the shore, comprising:
   at least one elongated dock section having opposite forward and rearward ends and opposite sides;
   leg means attached to said dock sections and having opposite upper and lower ends;
   a foot member on the lower end of each of said leg means and operatively engaging the bottom of the body of water such that dock section is supported by said leg means abovd the surface of said body of water, and
   means on said foot member for preventing suction between said foot member and the bottom of the body of water when said leg means is raised therefrom;
   said means for preventing suction including pad means between said foot member and the bottom of said body of water to prevent said foot member from penetrating the bottom, and means for securing said pad means to said foot member such that as said foot member is raised, said pad member is peeled from the bottom of the body of water substantially without suction being created between said pad means and said bottom.

26. The assembly of claim 25 wherein said means for securing said pad means to said foot member includes a plurality of elongated straps having opposite ends attached to said foot member and said pad means, respectively.

27. The assembly of claim 26 wherein said straps have sufficient length such that said foot member raises from engagement with said pad means before said straps become taut, thereby peeling said pad means from the bottom of said body of water.

28. The assembly of claim 25 wherein said foot member includes a plurality of apertures through which matter passes when said foot member is raised from the bottom of the body of water.

29. A boat dock assembly for retrievable extension into a body of water from the shore, comprising:
   a base secured to the shore;
   a plurality of elongated dock sections, including a first and last dock section, each having opposite forward and rearward ends and opposite sides,
   a plurality of hinge means for pivotally securing said dock sections together in an end-to-end relation, with said rearward end of said first dock section section being pivotally secured to said base by one of said hinge means, each of said hinge means having a pivot axis transverse to the longitudinal axis of of said dock sections,
   a plurality of support means attached to each dock section for supporting said dock sections above the surface of the body of water; and
   means for rolling said dock sections out of said body of water by sequentially pivoting each dock section in one direction above the respective hinge means, commencing with said last dock section, such that said dock sections roll into a spiral configuration adjacent said base, and for unrolling said dock sections from said spiral configuration into said body of water by sequentially pivoting each dock section in the opposite direction about the respective hinge means, commencing with said first dock section;
   said means for rolling and unrolling said dock sections including a plurality of elongated rail members, including a first and last rail member, extending beneath said dock sections, each having opposite forward and rearward ends, said rail members being pivotally secured to one another in an end-to-end relation by pin means, and said rail members being mounted beneath said dock section for axial movement with respect thereto;
   a plurality of pins each of which is fixed to one of said dock sections;
   pin engagement means on each rail intermediate said forward and rearward ends thereof; and
   means for moving said rail members axially away from said base so that pin engagement means sequentially engage the respective pins on said dock sections, commencing with said last dock section, such that said dock sections sequentially pivot about the respective hinge means, and thereby roll into said spiral configuration, and for moving said rail member axially toward said base such that said dock sections sequentially pivot about the respective hinge means and thereby unroll from said spiral configuration, commencing with said first dock section.

30. The assembly of claim 29 wherein said pin engagement means is the rearward end of a slot formed in each rail member, each of said pins on said dock sections being received within said slot on one of said rail members.

31. The assembly of claim 29 wherein said means for moving said rail members includes an elongated threaded shaft mounted in said base for rotation about the longitudinal axis thereof; a truck assembly threadably received on said shaft for movement therealong during rotation of said shaft and being pivotally connected to said first rail member; and power means for rotating said shaft in a first direction such that said truck assembly moves said rail members axially away from said base and in a second direction such that said truck assembly moves said rail members axially toward said base.

32. The assembly of claim 31 wherein said power means is an electric motor.

33. The assembly of claim 29 further comprising cam means operatively mounted to and beneath each dock section and cam follower means on each rail member for controlling the pivotal movement of said dock sections.

34. The assembly of claim 33 wherein said cam means includes an upper cam surface and a lower cam surface and said cam follower means includes an upper cam follower surface and a lower cam follower surface, said upper cam follower surface engaging said upper cam surface at least when said dock section is pivoting in said one direction, and said lower cam follower surface engaging said lower cam surface at least when said dock section is pivoting in said opposite direction.

35. The assembly of claim 34 wherein said cam means is a pair of spaced apart plates attached to each dock section adjacent the forward end thereof and below the respective hinge means, each plate having an open-ended arcuate slot therein, and said cam follower is a bushing on each end of said pin means, said bushings being received in said slots during the pivoting action of said dock sections.

36. The assembly of claim 29 wherein the lengths of said dock sections are successively shorter progressing from said first dock section through at least the next-to-the-last dock section, the lengths of said rail members are successively shorter progressing from said first rail member through said last rail member, and the distance between said pin engagement means and said forward end of the respective rail member being successively shorter progressing from said first rail member through said last rail member.

* * * * *